W. HENSHAW.
FLOWER STAKE.
APPLICATION FILED OCT. 18, 190.
899,046.
Patented Sept. 22, 1908.
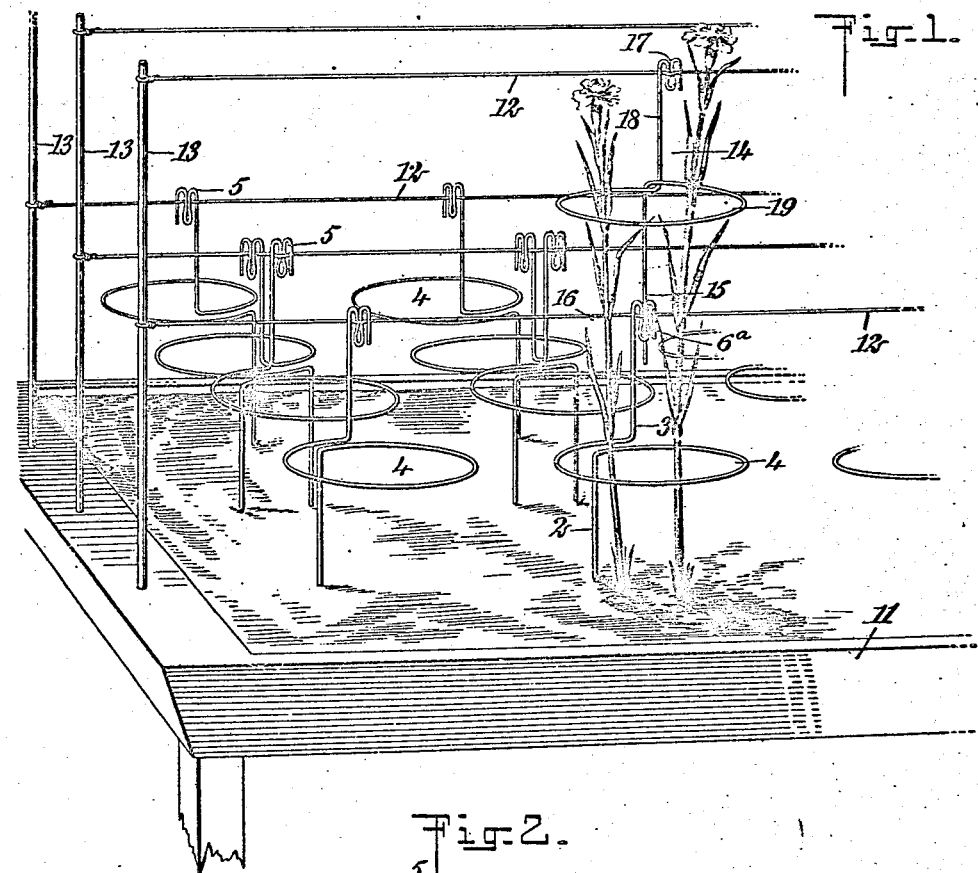
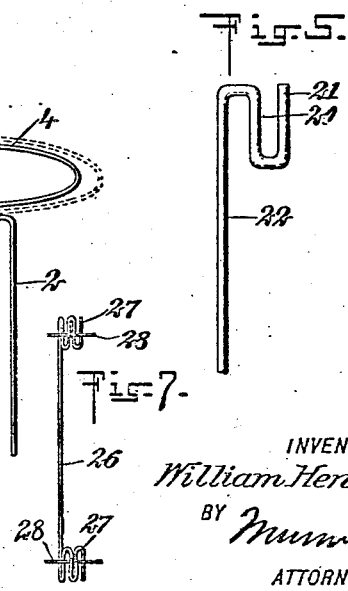
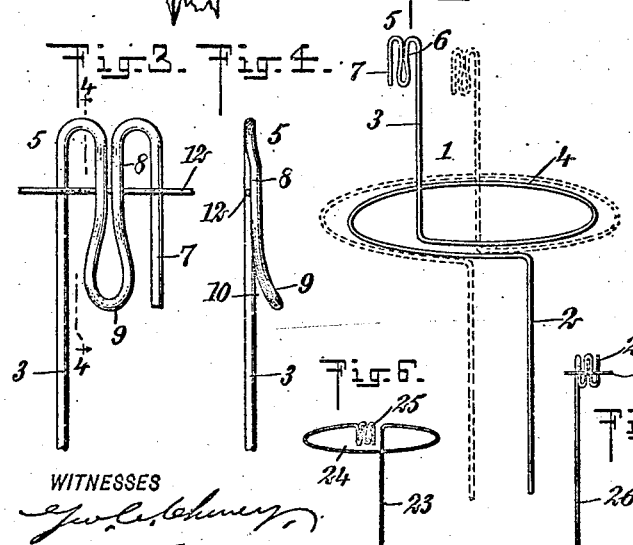
WITNESSES
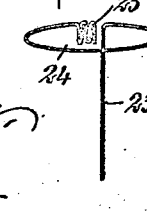
INVENTOR
William Henshaw
BY
ATTORNEYS

UNITED STATES PATENT OFFICE.

WILLIAM HENSHAW, OF SPRINGFIELD, NEW JERSEY.

FLOWER-STAKE.

No. 899,046.  Specification of Letters Patent.  Patented Sept. 22, 1908.

Application filed October 18, 1907. Serial No. 398,002.

*To all whom it may concern:*

Be it known that I, WILLIAM HENSHAW, a citizen of the United States, and a resident of Springfield, in the county of Union and State of New Jersey, have invented a new and Improved Flower-Stake, of which the following is a full, clear, and exact description.

This invention relates to flower supports or flower stakes such as used by florists for supporting plants, and the object of the invention is to produce a stake or support which will be adjustable to suit plants of different sizes, and having a special construction facilitating the attachment of the stake to supporting wires or cords, such as used by florists for supporting the plants and holding them in an upright position when being sprayed.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective showing a portion of a florist's bench or table provided with flower stakes constructed according to my invention; Fig. 2 is also a perspective representing one of the stakes, and illustrating the manner in which the stake may be adjusted; Fig. 3 is a side elevation showing the head of the stake and illustrating especially the manner in which it operates in enabling the stake to be attached to a running wire or cord; Fig. 4 is a vertical section taken on the line 4—4 of Fig. 3, and further illustrating the construction of the head; Fig. 5 is a side elevation of the head and upper portion of the stake, showing a modified form of the head; Fig. 6 is a perspective showing a modified form of the stake, and Fig. 7 is a side elevation showing a double headed stake to be used as a strut or spacer between line wires.

Referring more particularly to the parts, and especially to Figs. 1 to 5 inclusive, 1 represents the stake. This stake is preferably formed of galvanized or malleable wire; its lower portion is formed with a straight vertical stem or staff 2, its upper portion being formed with a vertical extension or neck 3, which is parallel with the stem. The neck and staff are connected integrally by a loop or open ring 4, which is disposed in a plane at right angles to the stem and neck. The upper end of the neck 3 is preferably bent as shown in Figs. 1 to 4, to form a head 5 having the shape of an inverted "W"; that is, the material is bent so as to present a downwardly projecting bifurcated tongue 6. Beyond this tongue a downwardly projecting tail 7 is formed. The tail 7 and the neck 3 lie in the same plane, but, as indicated in Fig. 4, the body of the tongue is slightly offset from this plane, as indicated at 8. The lower extremity of the tongue is curved outwardly, as indicated at its tip 9, so that a reentrant angle or V-shaped throat 10 is formed when the head is viewed at its edge, as shown in Fig. 4.

When the stake is used for supporting an isolated plant, the staff 2 is forced into the earth, and the ring or loop 4 is disposed around the body of the plant. If the plant is small, the ends of the loop may be overlapped considerably as indicated in Fig. 2 in the full lines; if the plant is larger, the loop may be pulled outwardly so as to enlarge its diameter, as indicated in the dotted lines. Furthermore, if the stake is applied to a growing plant, the loop may be enlarged from time to time so as to adapt its diameter to the enlarging dimensions of the growing plant.

It is a common practice with florists to employ flower stakes for separate plants, and to connect these stakes by parallel lines or wires so that the wires assist in supporting the stakes when the plants are sprayed, giving a desirable strength and rigidity to the construction. Such an arrangement as this is illustrated in Fig. 1, where 11 represents a table upon which the plants may be set out in rows. Longitudinally of the rows are arranged the line wires or cords 12 which are disposed horizontally, as shown, the ends being attached to uprights or standards 13 at the ends of the table. In using my stake with such an arrangement as this, I force the head 5 down over one of the line wires 12 after the stake has been set substantially into position around the plant, the wire passing under the tongue 6 and over the neck and tail 3 and 7, as illustrated most clearly in Fig. 3. The offset body of the tongue produces a slight wave in the wire. The tension in the wire, together with the resiliency of the head, suffices to hold the head rigidly upon the wire. In this way a number of plants in a row may be provided with supporting stakes having loops as described, and having heads which are attached to a common running wire extending longitudinally of the row. Furthermore, when the plants are of sufficient height to make it necessary to brace them higher up than usual, I provide a stake 14 having a closed ring 19, as illustrated in Fig. 1. This stake, instead of having its lower end in the ground, has its staff 15 stuck through the eye 6ª formed in the tongue of the stake just below. The upper end of its stem 18 is formed with a head 17, which is attached to an upper line wire 12, in the manner suggested, the ring 19 being disposed about the body of the plant.

Instead of forming the head as described, that is, in the form of a "W", I may give it the form of a double "U", as illustrated in Fig. 5. In this form the head is bent so as to present a downward extension or tongue 20, and beyond the tongue, the end of the material is bent to form a tail 21. The wire is then passed across the front of the tongue 20 and behind the neck 22 and the tail 21. In this way the wire is given a slight offset, so that the tension of the wire and the resiliency of the head operate to support the staff, as in the preferred form.

When the stake is constructed as illustrated in Fig. 6, the staff 23 is formed at its upper end with a loop 24 and the end of the loop is formed with a W head 25, similar to the head 5 of Fig. 2. This enables the side of the loop to be attached to one of the run wires as will be readily understood. I may form a double headed staff 26 as illustrated in Fig. 7, forming a W head 27 at each end which enables a pair of parallel run wires 28 to be held apart as illustrated. Attention is called to the fact that the staff and the stem do not project into the space surrounded by the loop, and hence the opening through the loop remains unobstructed to receive the body of the plant.

Having thus described my invention, I claim as new and desire to secure by Letters Patent:

1. A flower stake consisting of an extensible loop normally disposed in a horizontal plane having unattached ends which may overlap, one of said ends having a staff extending downwardly to be thrust into the ground, said loop further having an upwardly extending stem with a head adapted to engage removably a line wire, said stem and said staff being arranged outside of the space surrounded by said loop whereby the opening of said loop is unobstructed.

2. A flower stake formed of wire and consisting of an extensible loop having ends which may overlap, one end of said loop having an integral staff extending downwardly therefrom, the other end of said loop having an integral stem extending upwardly therefrom and adapted to engage a line wire, said staff and said stem being disposed outside the space surrounded by said loop whereby the opening through said loop is unobstructed.

3. A flower-stake consisting of an extensible loop having overlapping ends, one of said ends having an integral staff extending downwardly, to be thrust into the ground, the other of said ends having an integral stem extending upwardly and terminating in a convolute head to engage a line wire, said staff and said stem lying substantially in tangent planes to said loop, whereby the circular opening through said loop is unobstructed.

4. A flower stake comprising a loop normally disposed in a substantially horizontal plane and adapted to encircle a plant, a stem extending upwardly from said loop, the upper end of said stem being bent laterally and downwardly to form a downwardly projecting tongue composed of a double bar, and a downwardly projecting tail beyond said tongue.

In testimony whereof I have signed my name to this specification in the presence of two subscribing witnesses.

WILLIAM HENSHAW.

Witnesses:
F. D. AMMEN,
JOHN P. DAVIS.